US012318646B1

(12) United States Patent
Rho et al.

(10) Patent No.: US 12,318,646 B1
(45) Date of Patent: Jun. 3, 2025

(54) FIRE EXTINGUISHING AGENT COMPOSITION AND FIRE EXTINGUISHER FOR ELECTRIC VEHICLES CONTAINING THE SAME

(71) Applicant: ZF Solution Co. Ltd., Gyeonggi-do (KR)

(72) Inventors: Jae Yun Rho, Gyeonggi-do (KR); Jeong Wook Lee, Gyeonggi-do (KR)

(73) Assignee: ZF Solution Co. Ltd., Gyeonggi-Do (KR)

( * ) Notice: Subject to any disclaimer, the term of this patent is extended or adjusted under 35 U.S.C. 154(b) by 0 days.

(21) Appl. No.: 18/764,482

(22) Filed: Jul. 5, 2024

(51) Int. Cl.
*A62D 1/00* (2006.01)
*A62C 3/00* (2006.01)
*A62C 3/07* (2006.01)
*A62C 3/16* (2006.01)

(52) U.S. Cl.
CPC .............. *A62D 1/0035* (2013.01); *A62C 3/00* (2013.01); *A62C 3/07* (2013.01); *A62C 3/16* (2013.01); *A62D 1/0042* (2013.01)

(58) Field of Classification Search
None
See application file for complete search history.

(56) References Cited

U.S. PATENT DOCUMENTS

| | | | | |
|---|---|---|---|---|
| 4,761,401 | A * | 8/1988 | Couchman | C07H 13/04 536/123 |
| 11,046,642 | B2 * | 6/2021 | Karp | B01J 21/08 |
| 11,660,487 | B2 * | 5/2023 | Worsman | A62D 1/0035 169/30 |
| 2015/0191607 | A1 * | 7/2015 | McDaniel | C09D 5/1625 424/94.64 |
| 2016/0068440 | A1 * | 3/2016 | Spangenberg | C04B 38/0067 106/602 |
| 2019/0262647 | A1 * | 8/2019 | Havelka-Rivard | A62D 1/0071 |
| 2020/0369591 | A1 * | 11/2020 | Abraham | C07C 67/54 |
| 2022/0267246 | A1 * | 8/2022 | Abraham | C07C 67/03 |
| 2022/0387836 | A1 * | 12/2022 | Cornelius | A62D 1/0071 |

FOREIGN PATENT DOCUMENTS

| | | | | |
|---|---|---|---|---|
| JP | 2019058279 A * | 4/2019 | | |
| KR | 2023124438 A * | 8/2023 | | A62D 1/0042 |
| KR | 2667629 B1 * | 5/2024 | | A62D 1/0042 |

* cited by examiner

*Primary Examiner* — Joseph D Anthony
(74) *Attorney, Agent, or Firm* — The PL Law Group, PLLC

(57) ABSTRACT

A fire extinguishing agent composition includes an amphiphilic solvent and water. The composition is capable of effectively extinguishing a fire in an electric vehicle by reducing the vapor pressure of a volatile organic solvent by including an amphiphilic solvent and water. For example, the amphiphilic solvent may be ethyl 3-hydroxypropanoate.

4 Claims, 6 Drawing Sheets

FIRE EXTINGUISHING AGENT COMPOSITION AND FIRE EXTINGUISHER FOR ELECTRIC VEHICLES CONTAINING THE SAME

CROSS-REFERENCE TO RELATED APPLICATION AND CLAIM OF PRIORITY

This application claims the benefit under 35 USC § 119 of Korean Patent Application No. 10-2024-0074850, filed on Jun. 10, 2024, in the Korean Intellectual Property Office, the entire disclosure of which is incorporated herein by reference for all purposes.

BACKGROUND

1. Technical Field

The present invention relates to a fire extinguishing agent composition and a fire extinguisher for electric vehicles containing the same.

2. Description of the Background Art

Recently, with the rapid expansion of electric vehicle distribution, fires in electric vehicles have also surged. Approximately 20% of fires in electric vehicles occur due to accessories installed in the vehicle, such as dashcam auxiliary batteries and portable chargers. Another 30% occur in other parts of the vehicle (connectors, driver's seat heating, etc.). The remaining 50% occur in the 'high-voltage battery'. Thus, half of the fires in electric vehicles are caused by batteries.

Unlike internal combustion engine vehicles, electric vehicles use battery packs as their energy source. Most fires in electric vehicles originate from these battery packs, especially lithium-ion batteries. Lithium-ion batteries can cause thermal runaway due to overheating, overcharging, physical damage, and internal short circuits, which can lead to fires.

Fires in electric vehicle battery occur at high temperatures and can release large amounts of heat and toxic gases.

When extinguishing electric vehicle battery fires with water, the electrolyte does not dissolve in the water and can continue to burn in a phase-separated state, making the extinguishing effect minimal. While water can dissolve some electrolytes, it requires a very large amount of water.

Recent reports indicate that tens of thousands of liters of water are needed to extinguish fires in electric vehicles using water. To address this, copper salts, carbonates, and ceramic powders are added to the extinguishing agent. The principle is that when water evaporates due to fire heat, copper salts, etc., coat the surface, aiding in extinguishment. However, fire extinguishing agents containing copper salts, carbonates, etc., are effective in preventing reignition after the liquid in the extinguishing agent has evaporated due to heat, but their extinguishing effect is minimal in the initial or active fire-fighting stages.

The mechanism of electric vehicle battery fire occurrence involves the rupture of secondary batteries or solvent containers due to impact, leakage of organic solvents, ignition by sparks, temperature rise, vapor generation due to the temperature rise of non-aqueous organic solvents, battery cell expansion and cracking, and the occurrence and eruption of flames with vapor and sparks (thermal runaway), leading to a rapid intensification of the fire.

In the mechanism of electric vehicle battery fire occurrence, the leakage and evaporation of organic solvents due to the rupture of containers (secondary batteries), ignition by evaporated vapors and sparks, temperature rise due to fire, and increased vapor concentration in the atmosphere due to increased evaporation intensify the fire.

The most critical aspect of the fires in electric vehicle battery progression is the suppression of organic solvent vapor generation, which acts as the main fuel in the fire.

However, with current technology, it is challenging to fundamentally block thermal runaway caused by the evaporation of flammable organic solvents due to the temperature rise of the electrolyte.

SUMMARY

The present invention aims to provide a fire extinguishing agent composition that reduces the evaporation of volatile organic solvents.

The present invention aims to provide a fire extinguisher for electric vehicles comprising the said fire extinguishing agent composition.

1. A fire extinguishing agent composition comprising an amphiphilic solvent and water.
2. The fire extinguishing agent composition according to 1 above, wherein the amphiphilic solvent is non-volatile.
3. The fire extinguishing agent composition according to 1 above, wherein the amphiphilic solvent is ethyl 3-hydroxypropanoate.
4. The fire extinguishing agent composition according to 3 above, wherein the amphiphilic solvent further comprises butyl 3-hydroxypropanoate or glycerol carbonate.
5. The fire extinguishing agent composition according to 1 above, wherein the amphiphilic solvent is present in an amount of 20 to 95% by volume, and the water is present in an amount of 5 to 80% by volume.
6. The fire extinguishing agent composition according to 1 above, for use in extinguishing fires in electric vehicles.
7. A fire extinguisher for electric vehicles comprising the composition of 1 above.

The fire extinguishing agent composition of the present invention can reduce the vapor pressure of volatile organic solvents.

The fire extinguishing agent composition of the present invention and the fire extinguisher for electric vehicles containing the same can effectively suppress fires in electric vehicles.

DETAILED DESCRIPTION

Figure 1A:
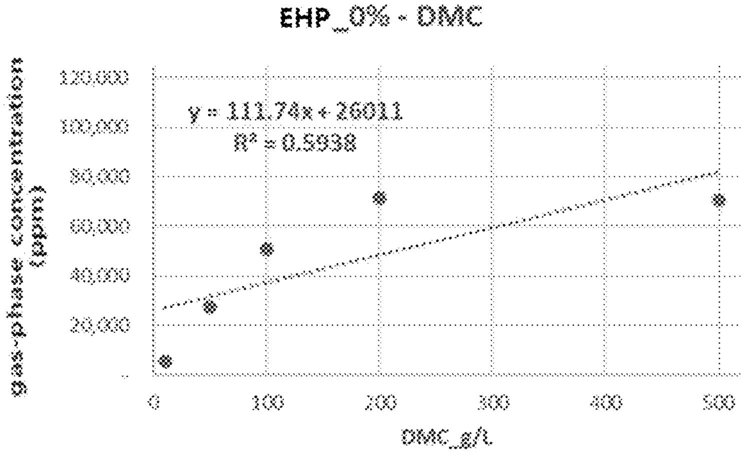
FIGS. 1A to 1C show the change in the gas-phase concentration of dimethyl carbonate (DMC) when varying the ratio of EHP input.

Hereinafter, the present invention will be described in detail.

The present invention relates to a fire extinguishing agent composition comprising an amphiphilic solvent.

The fire extinguishing agent composition of the present invention can dissolve volatile organic solvents.

The amphiphilic solvent has a high solubility in the electrolyte of electric vehicle batteries. High solubility means that the electrolyte can be completely dissolved without phase separation.

The amphiphilic solvent may be non-volatile.

The solvents in the electrolyte used in electric vehicle batteries are mostly volatile organic solvents. If the battery pouch or the electrolyte container is damaged by impact, the electrolyte leaks. The organic solvent in the leaked electrolyte evaporates into the atmosphere and acts as fuel in the event of a fire. Ignition occurs in the electric vehicle battery due to the evaporated organic solvent and sparks. As ignition progresses and the temperature rises, the evaporation of the leaked volatile organic solvent accelerates. If the concentration of volatile organic solvent vapor in the atmosphere increases, it causes thermal runaway and intensifies the fire.

When the volatile organic solvent is dissolved in the amphiphilic solvent rather than existing alone, its vapor pressure is significantly reduced, thereby suppressing evaporation into the atmosphere. This means a reduction in the fuel for fires in electric vehicle batteries.

The amphiphilic solvent has both hydrophobic and hydrophilic properties, allowing it to dissolve both hydrophobic and hydrophilic substances.

The hydrophobicity of the amphiphilic solvent dissolves flammable electrolytes or volatile organic solvents generated during electric vehicle fires and effectively reduces their vapor pressure. This significantly reduces the possibility of flammable electrolytes or volatile organic solvents being used as fuel for the fire, allowing the fire to be effectively suppressed.

The hydrophilicity of the amphiphilic solvent lowers the interfacial tension between water and the electrolyte. Lower interfacial tension between water and the electrolyte allows the amphiphilic solvent to easily penetrate the battery interior. The amphiphilic solvent penetrates the battery interior and dissolves the electrolyte. When the electrolyte is dissolved, evaporation is reduced, and the possibility of reignition is significantly lowered.

The amphiphilic solvent does not cause additional chemical reactions with the electric vehicle battery, improving chemical safety compared to using only water.

The amphiphilic solvent can be a green chemical product produced by biological methods. Green chemical products do not affect the surrounding environment after use and decompose quickly over time.

The amphiphilic solvent may have a high flash point and boiling point and can dissolve both water and organic solvents.

The flash point of the amphiphilic solvent may be, for example, 100° C. to 200° C., 110° C. to 190° C., or 110° C. to 150° C.

The boiling point of the amphiphilic solvent may be, for example, 100° C. to 400° C., 150° C. to 400° C., or 180° C. to 350° C.

The amphiphilic solvent may be ethyl 3-hydroxypropanoate.

Ethyl 3-hydroxypropanoate ($C_5H_{10}O_3$, ethyl-3-hydroxypropanoate, EHP) can be represented by the following chemical formula 1.

[Chemical Formula 1]

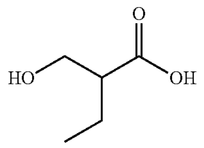

The hydroxyl group of ethyl 3-hydroxypropanoate binds with water, reducing the interfacial tension between water and the electrolyte.

The ethyl group of ethyl 3-hydroxypropanoate binds with volatile organic solvents, preventing their evaporation.

The amphiphilic solvent may further comprise butyl 3-hydroxypropanoate or glycerol carbonate.

Butyl 3-hydroxypropanoate ($C_7H_{14}O_3$, butyl-3-hydroxypropanoate, BHP) can be represented by the following chemical formula 2.

[Chemical Formula 2]

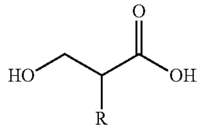

Herein, R represents a butyl group.

The hydroxyl group of butyl 3-hydroxypropanoate binds with water, reducing the interfacial tension between water and the electrolyte.

The butyl group of butyl 3-hydroxypropanoate binds with volatile organic solvents, preventing their evaporation.

When butyl 3-hydroxypropanoate contains a substituent with 5 or more carbon atoms instead of the butyl group, the binding strength with water is weakened.

Glycerol carbonate ($C_4H_6O_4$, glycerol carbonate, GC) can be represented by the following chemical formula 3.

[Chemical Formula 3]

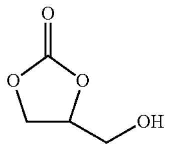

The hydroxyl group of glycerol carbonate binds with water, reducing the interfacial tension between water and the electrolyte.

Water imparts a cooling effect to the fire extinguishing agent due to its high heat capacity and latent heat of evaporation. It also provides an oxygen-blocking effect through the steam generated by evaporation.

The ratio of amphiphilic solvent to water is not particularly limited, and for example, the amphiphilic solvent can be included in an amount of 20 to 95% by volume, and water can be included in an amount of 5 to 80% by volume or the amphiphilic solvent can be included in an amount of 30 to 95% by volume, and water can be included in an amount of 5 to 70% by volume or the amphiphilic solvent can be included in an amount of 20 to 75% by volume, and water can be included in an amount of 25 to 80% by volume, or the amphiphilic solvent can be included in an amount of 30 to 70% by volume, and water can be included in an amount of 30 to 70% by volume. Within these ranges, the composition is excellent at reducing the vapor pressure of flammable electrolytes or volatile organic solvents, providing a cooling effect to the fire extinguishing agent, and blocking oxygen.

When the amphiphilic solvent comprises multiple solvents, the mixing ratio can be adjusted according to the fire stage (growth, flashover, fully developed, decay).

For example, when applied in the growth stage, ethyl 3-hydroxypropanoate can be included in an amount of 50 to 70% by volume, butyl 3-hydroxypropanoate in an amount of 0 to 5% by volume, and glycerol carbonate in an amount of 0 to 5% by volume or ethyl 3-hydroxypropanoate in an amount of 55 to 65% by volume, butyl 3-hydroxypropanoate in an amount of 0 to 5% by volume, and glycerol carbonate in an amount of 0 to 5% by volume or ethyl 3-hydroxypropanoate in an amount of 57 to 62% by volume, butyl 3-hydroxypropanoate in an amount of 0 to 5% by volume, and glycerol carbonate in an amount of 0 to 5% by volume.

When applied in the flashover stage, for example, ethyl 3-hydroxypropanoate can be included in an amount of 30 to 60% by volume, butyl 3-hydroxypropanoate in an amount of 0 to 5% by volume, and glycerol carbonate in an amount of 0 to 5% by volume or ethyl 3-hydroxypropanoate in an amount of 40 to 55% by volume, butyl 3-hydroxypropanoate in an amount of 0 to 5% by volume, and glycerol carbonate in an amount of 0 to 5% by volume or ethyl 3-hydroxypropanoate in an amount of 40 to 50% by volume, butyl 3-hydroxypropanoate in an amount of 0 to 5% by volume, and glycerol carbonate in an amount of 0 to 5% by volume.

When applied in the fully developed stage, for example, ethyl 3-hydroxypropanoate can be included in an amount of 30 to 60% by volume, butyl 3-hydroxypropanoate in an amount of 0 to 5% by volume, and glycerol carbonate in an amount of 0 to 5% by volume or ethyl 3-hydroxypropanoate in an amount of 40 to 55% by volume, butyl 3-hydroxypropanoate in an amount of 0 to 5% by volume, and glycerol carbonate in an amount of 0 to 5% by volume or ethyl 3-hydroxypropanoate in an amount of 40 to 50% by volume, butyl 3-hydroxypropanoate in an amount of 0 to 5% by volume, and glycerol carbonate in an amount of 0 to 5% by volume.

When applied in the decay stage, ethyl 3-hydroxypropanoate can be included in an amount of 50 to 70% by volume, butyl 3-hydroxypropanoate in an amount of 0 to 5% by volume, and glycerol carbonate in an amount of 0 to 5% by volume or ethyl 3-hydroxypropanoate in an amount of 55 to 65% by volume, butyl 3-hydroxypropanoate in an amount of 0 to 5% by volume, and glycerol carbonate in an amount of 0 to 5% by volume or 57 to 62% by volume, butyl 3-hydroxypropanoate in an amount of 0 to 5% by volume, and glycerol carbonate in an amount of 0 to 5% by volume.

If necessary, the amphiphilic solvent or water can be applied with dissolved additives.

Additives can include corrosion inhibitors, defoamers, pH adjusters, etc.

The corrosion inhibitor prevents corrosion of surrounding objects due to the application of the fire extinguishing agent, and it also prevents corrosion of the fire extinguishing container storing the agent.

The corrosion inhibitor can be sodium silicate.

The corrosion inhibitor can be included in an amount of, for example, 0.01 to 1%, 0.03 to 0.07% by weight based on 100 parts by weight of the total weight of the fire extinguishing agent composition.

The defoamer prevents foam generation in the fire extinguishing agent.

The defoamer can be a dimethylpolysiloxane-based silicone defoamer.

The defoamer can be included in an amount of, for example, 0.01 to 1%, 0.03 to 0.07% by weight, based on the total weight of the composition.

The pH adjuster promotes the absorption and neutralization of hydrogen fluoride (HF) that may be generated in fires in electric vehicles.

The pH adjuster can be an alkaline solution containing agents such as NaOH or KOH in a concentration range of 0.5M or less.

The pH adjuster can be included in an amount of, for example, 0.01 to 1% by weight, based on the total weight of the composition.

The fire extinguishing agent composition of the present invention can be applied to various fire extinguishing devices (machines, apparatuses) related to fire extinguishing, such as fire extinguishers, fire hydrants, fire trucks, and sprinklers.

As described above, since the fire extinguishing agent composition of the present invention can dissolve the electrolyte of electric vehicle batteries, it is preferably used for suppressing fires in electric vehicles.

The electrolyte can be, for example, a carbonate ester organic solvent, a carbonate organic solvent, or an ether organic solvent.

The electrolyte can be ethylene carbonate (EC), diethyl carbonate (DEC), propylene carbonate (PC), ethyl methyl carbonate (EMC), dimethyl carbonate (DMC), etc.

Furthermore, the present invention relates to a fire extinguisher comprising the above composition.

The fire extinguisher of the present invention is filled with the above composition.

In addition to the above composition, the fire extinguisher of the present invention can be further filled with compressed non-combustible gas to secure injection pressure.

The non-combustible gas is a gas other than oxygen, for example, nitrogen, carbon dioxide, etc.

The fire extinguisher of the present invention can be used for extinguishing fires in electric vehicles.

Additionally, the present invention relates to a method of fire suppression.

The method of the present invention includes the step of applying a fire extinguishing agent composition containing an amphiphilic solvent and water to the fire.

Applying to the fire includes extinguishing the fire with the said composition. The composition can be applied to the fire, and the method of application is not limited. For example, the composition can be contained in a fire extinguisher and sprayed onto the fire.

The descriptions of the fire extinguishing agent composition and the fire extinguisher can be as previously illustrated.

The fire, for example, can be a fire in an electric vehicle. The electric vehicle, for example, can contain the previously illustrated electrolyte.

EXAMPLE

Analyzing the Evaporation Reduction Effect of Electrolyte (Volatile Organic Solvents) by EHP In general, volatile organic solvents evaporate from liquid to gas phase when exposed to air. Flammable/volatile organic solvents, such as dimethyl carbonate (DMC), ethylmethyl carbonate (EMC), diethyl carbonate (DEC), etc, which are representative of the non-volatile/amphiphilic solvents presented in the present invention, whether EHP can inhibit the evaporation of organic solvents into air was summarized for each condition by measuring the gas phase concentration of the evaporated organic solvent.

The phenomenon of inhibiting the evaporation of volatile organic solvents when non-volatile and amphiphilic solvents are mixed with volatile organic solvents can be explained through Henry's law and the principle of solubility.

Henry's law states that the concentration of a gas dissolved in a liquid at a certain temperature is proportional to its pressure. Applied to volatile organic solvents in electrolytes, this means that the lower the partial pressure of the organic solvent in the liquid state, the less evaporation occurs.

When a non-volatile solvent is mixed, the concentration of the volatile solvent at the surface decreases, which in turn decreases the partial pressure of the volatile solvent, which in turn decreases the evaporation rate.

According to the solubility principle, non-volatile EHPs interact with volatile organic solvents and stabilize them in the solvent. This interaction prevents the volatile molecules from clumping together, which in turn reduces evaporation. In other words, the non-volatile solvent dissolves the volatile solvent better, reducing its activity on the surface of the organic solvent and slowing evaporation.

Figure 1B:
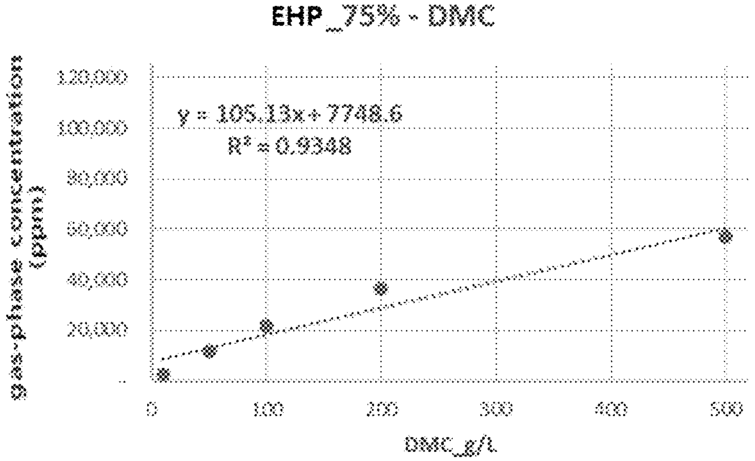
Figure 1C:
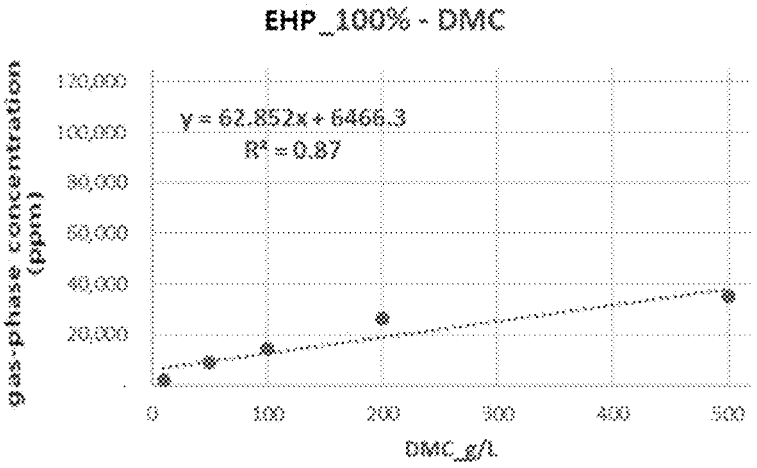

FIGS. 1A to 1C show the change in the gas phase concentration of dimethyl carbonate (DMC) as a function of the percentage of EHP added.

As the concentration of DMC increases, the vapor phase concentration resulting from evaporation into the air also increases. Referring to FIGS. 1A to 1C, in the absence of EHP, the vapor phase concentration was high, up to about 75,000 ppm, when DMC was added to water at the concentration on the x-axis. As the percentage (%) of EHP increases, the maximum gas phase concentration decreases significantly. When DMC is dissolved in 100% EHP, the vapor phase concentration is reduced by less than half. This indicates a significant fire suppression effect by reducing flammability.

Figure 2A:
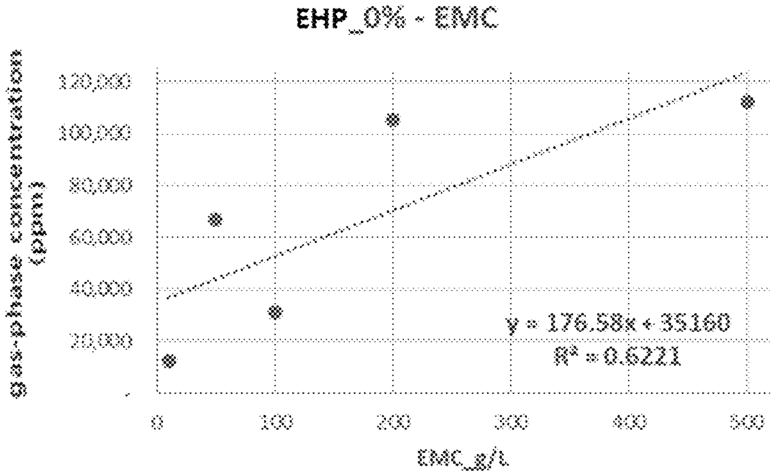
FIGS. 2A to 2C show the change in the gas-phase concentration of ethyl methyl carbonate (EMC) when varying the ratio of EHP input.
Figure 2B:
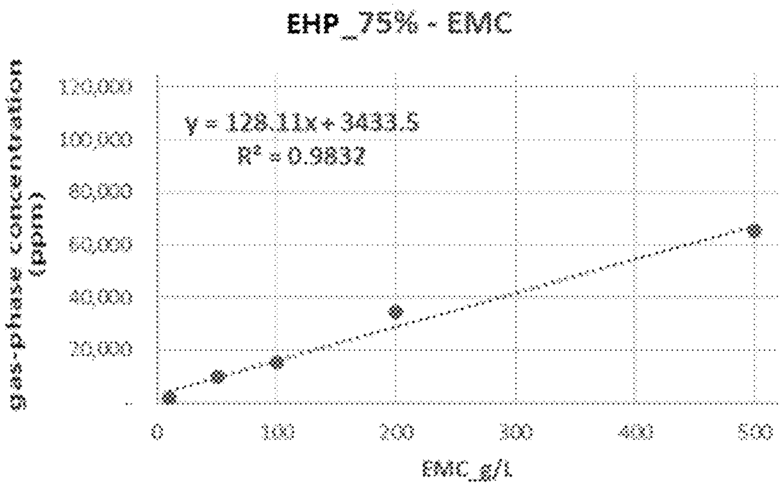
Figure 2C:
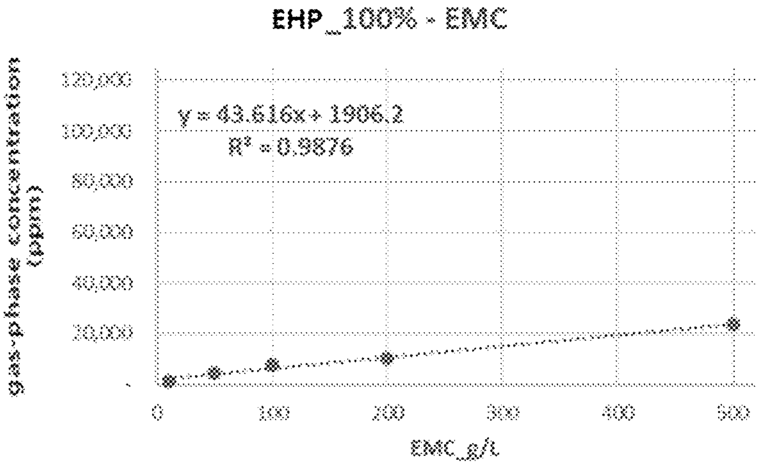

FIGS. 2A to 2C show the change in the gas phase concentration of ethyl methyl carbonate (EMC) as a function of the ratio of EHP added.

Referring to FIGS. 2A to 2C, in the absence of ethyl methyl carbonate (EMC), when EMC was added to water at the concentration on the x-axis and mixed, the vapor phase concentration was high, up to about 100,000 ppm at a liquid concentration of 200 g/L of EMC. As the percentage (%) of EHP increases, the maximum vapor phase concentration decreases significantly. At 100% EHP, even a dissolved EMC liquid concentration of 500 g/L is reduced to less than one-fifth of the control vapor phase concentration (20,000 ppm). This shows a clear fire suppression effect by reducing flammability.

Figure 3A:
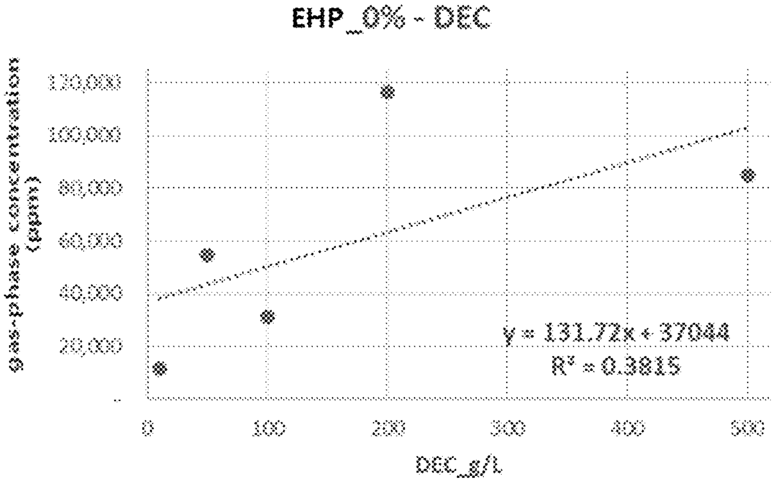
FIGS. 3A to 3C show the change in the gas-phase concentration of diethyl carbonate (DEC) when varying the ratio of EHP input.
Figure 3B:
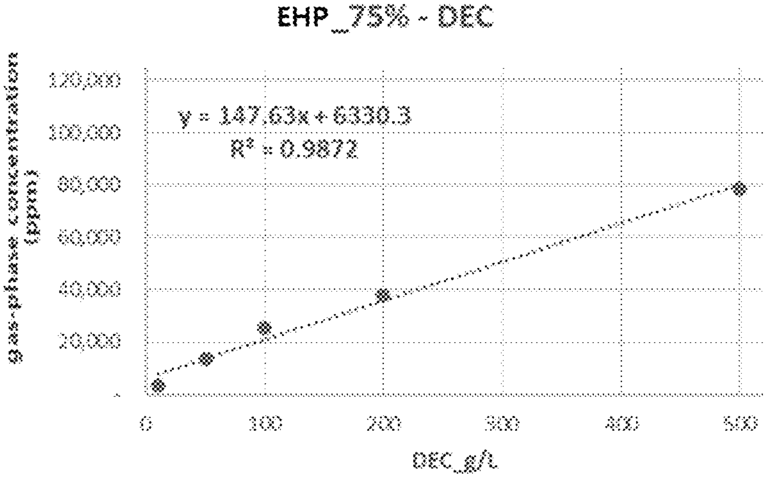
Figure 3C:
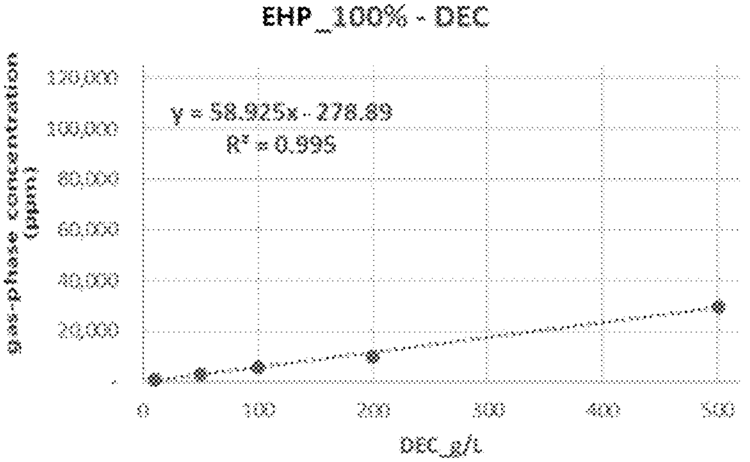

FIGS. 3A to 3C show the change in vapor phase concentration of diethyl carbonate (DEC) as a function of the percentage of EHP added.

In the absence of EHP, when DEC was added to water at the concentration on the x-axis and mixed, the vapor phase concentration was high, up to about 110,000 ppm at a liquid concentration of 200 g/L of DEC. As the EHP percentage (%) increases, the maximum vapor phase concentration decreases significantly. At 100% EHP, the liquid phase concentration of EMC is reduced to less than one-fifth of the control vapor phase concentration (25,000 ppm) even when a whopping 500 g/L of EMC is dissolved. This shows a clear fire suppression effect by reducing flammability.

In explaining the fire suppression mechanism of the present invention, it is essential for the evaporation of fuel to occur for a fire to start. However, if the evaporation of such volatile organic solvents is suppressed, the formation of flammable vapors decreases, thereby reducing the risk of fire. Therefore, by using non-volatile solvents, the evaporation of volatile organic solvents can be effectively controlled, lowering the possibility of fire occurrence. Applying this principle to fire suppression technology offers a new approach to effectively reduce the risk of fire by inhibiting the evaporation of volatile organic compounds.

Dissolution and Flammability Testing of Electrolyte Volatile Organic Solvents by EHP The following is an example of applying a digestion solution in which EHP, a representative amphiphilic solvent presented in the present invention, is mixed with water in various ratios to dimethyl carbonate (DMC), ethylmethyl carbonate (EMC), diethyl carbonate (DEC), etc. which are flammable/volatile organic solvents mainly used in secondary battery electrolytes. In other words, by checking the complete dissolution according to the change of the ratio of electrolyte organic solvent:water:EHP, it is judged that it is highly unlikely to evolve under the condition of phase separation. Separately, the flammability was checked by igniting the fire at several ratios of the three substances and plotted on the three-phase dissolution graph.

Figure 4:
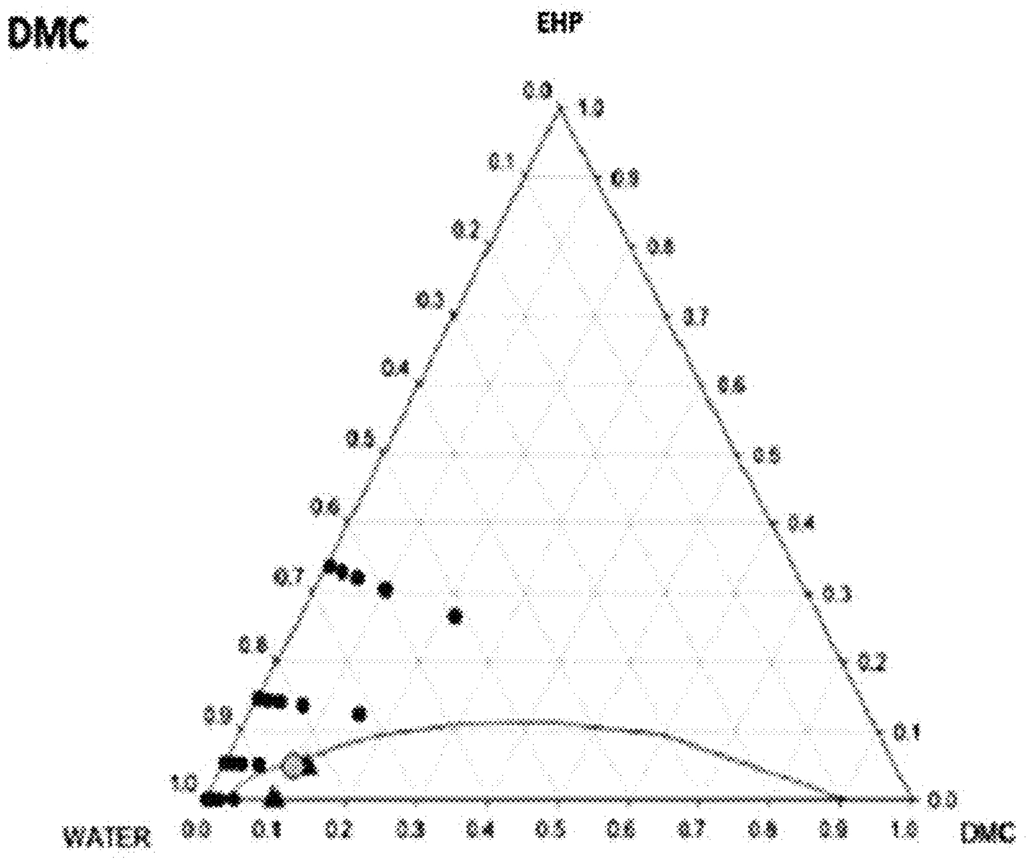
FIG. 4 is a ternary phase solubility graph of water:EHP:DMC.

FIG. 4 is a three-phase dissolution graph of water:EHP:DMC.

Figure 5:
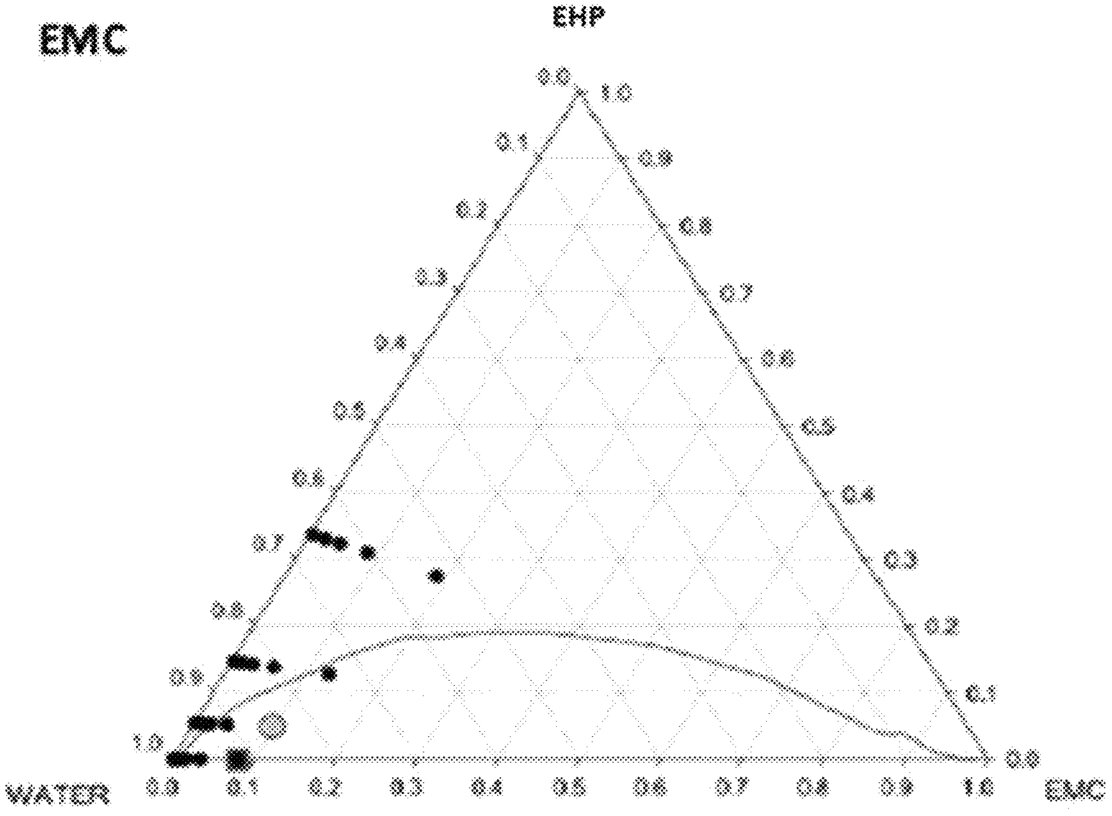
FIG. 5 is a ternary phase solubility graph of water:EHP:EMC.

FIG. 5 is a three-phase dissolution graph of water:EHP:EMC.

Figure 6:
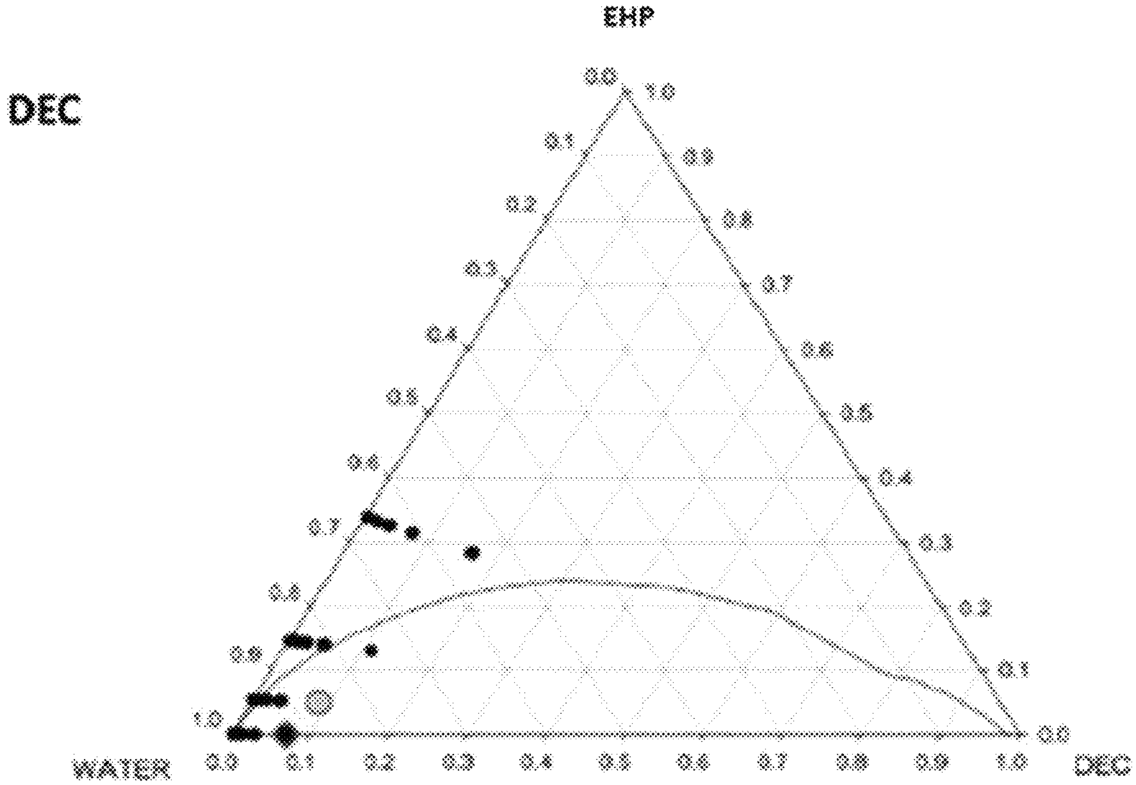
FIG. 6 is a ternary phase solubility graph of water:EHP:DEC.

FIG. 6 is a three-phase dissolution graph of water:EHP:DEC.

Referring to FIG. 4 to FIG. 6, the lower part of the area drawn by the line in the triangle is the area where phase separation occurs and where printing may occur.

Lithium-Ion Battery Fire Extinguishing Performance

A commercially available electrolyte solution (EC:DEC:DMC=1:1:1 (v/v)) commonly used in lithium-ion batteries was added to a stainless steel cylindrical metal container and ignited by a torch to simulate a lithium battery fire. The fire was then extinguished by adding 20 mL of fire extinguishing agent mixed in the ratio shown in Table 1 below.

TABLE 1

| Volume Ratio | Example 1 | Example 2 | Example 3 | Example 4 | Example 5 | Example 6 |
|---|---|---|---|---|---|---|
| EHP | 70 | 60 | 50 | 40 | 30 | 30 |
| BHP | — | 5 | 5 | 5 | — | 5 |
| GC | — | 5 | 5 | 5 | — | 5 |
| water | 30 | 30 | 40 | 50 | 70 | 60 |

During the fire extinguishing performance test, the electrolyte was ignited, and the same volume of fire extinguishing liquid was added to the ignited electrolyte to extinguish it. After 2 minutes of extinguishing, the fire extinguishing performance was evaluated by reignition by a gas torch, and the results are shown in Table 2. For comparison, the extinguishing liquid of a commercially available fire extinguisher (Speed 119) was collected separately and 20 mL was used as the extinguishing liquid in the same test. In terms of extinguishing time, if the fire was not completely extinguished within 20 seconds, it was judged to have poor fire extinguishing performance.

TABLE 2

| | Example 1 | Example 2 | Example 3 | Example 4 | Example 5 | Example 6 | Comparison example |
|---|---|---|---|---|---|---|---|
| extinguishing | O | O | O | O | O | O | X |
| extinguishing time (sec) | 3 | 3 | 5 | 5 | 12 | 9 | Over 20 seconds |
| reignition | X | X | X | X | X | X | O |

Digestion is Judged by the Following Criteria

O: fully digested

X: Incomplete digestion

The criteria for reignition is as follows.

O: Reignited

X: Not reignited

What is claimed is:

1. A method of fire suppression, the method comprising: applying a fire extinguishing agent composition comprising an amphiphilic solvent and water to a fire; wherein the amphiphilic solvent is ethyl 3-hydroxypropanoate.

2. The method of claim 1, wherein the amphiphilic solvent further comprises butyl 3-hydroxypropanoate or glycerol carbonate.

3. The method of claim 1, wherein the amphiphilic solvent is present in an amount of 20 to 95% by volume, and the water is present in an amount of 5 to 80% by volume.

4. The method of claim 1, wherein the fire is an electric vehicle fire.

* * * * *